US012618751B2

(12) United States Patent
Bian et al.

(10) Patent No.: US 12,618,751 B2
(45) Date of Patent: May 5, 2026

(54) ROCK SAMPLE EXTRACTION DEVICE

(71) Applicant: Institute of Geology and Geophysics, Chinese Academy of Sciences, Beijing (CN)

(72) Inventors: Hang Bian, Beijing (CN); Zhaobin Zhang, Beijing (CN); Shouding Li, Beijing (CN); Xiao Li, Beijing (CN); Jianming He, Beijing (CN); Bo Zheng, Beijing (CN); Tianqiao Mao, Beijing (CN); Guanfang Li, Beijing (CN); Peng Guo, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 18/833,910

(22) PCT Filed: May 22, 2024

(86) PCT No.: PCT/CN2024/094721
§ 371 (c)(1),
(2) Date: Jul. 28, 2024

(87) PCT Pub. No.: WO2024/240189
PCT Pub. Date: Nov. 28, 2024

(65) Prior Publication Data
US 2025/0146909 A1 May 8, 2025

(30) Foreign Application Priority Data
May 25, 2023 (CN) .......................... 202310593526.4

(51) Int. Cl.
*G01N 1/08* (2006.01)
(52) U.S. Cl.
CPC .................................... *G01N 1/08* (2013.01)

(58) Field of Classification Search
CPC .................................... G01N 1/08; G01N 1/04
(Continued)

(56) References Cited

U.S. PATENT DOCUMENTS 2,747,401 A * 5/1956 Doll ........................ E21B 49/10
73/152.05

FOREIGN PATENT DOCUMENTS

CN 211570981 U 9/2020
CN 211668856 U 10/2020
(Continued)

OTHER PUBLICATIONS

China National Intellectual Property Administration. Notice of Grant of Invention Patent Right of foreign counterpart 202310593526.4 Jul. 19, 2023.
(Continued)

*Primary Examiner* — Laura Martin
*Assistant Examiner* — Nashmiya S Fayyaz
(74) *Attorney, Agent, or Firm* — Hawaii Patent Services; Nathaniel K. Fedde; Kenton N. Fedde

(57) ABSTRACT

The present invention discloses a rock sample extraction device, which comprises a downhole plate and a plurality of sampling components uniformly arranged on the downhole plate, wherein the sampling components are used for sampling rock samples in well areas with different depths, and each sampling component is used for sampling at the upper and lower ends of the same well area; each sampling component comprises anisotropic extraction cylinders arranged on the downhole plate and a power member arranged between the anisotropic extraction cylinders, and the power member drives the anisotropic extraction cylinders to perform telescopic movement in opposite directions, so that the anisotropic extraction cylinders can perform sampling operation when extending outwards.

8 Claims, 6 Drawing Sheets

(58) Field of Classification Search
USPC ........................................ 73/864.44; 175/236
See application file for complete search history.

(56) References Cited

FOREIGN PATENT DOCUMENTS

| | | | | |
|---|---|---|---|---|
| CN | 213336860 | U | * | 6/2021 |
| CN | 113532927 | A | | 10/2021 |
| CN | 214427012 | U | | 10/2021 |
| CN | 113624539 | A | | 11/2021 |
| CN | 215004411 | U | * | 12/2021 |
| CN | 217055143 | U | | 7/2022 |
| CN | 114949911 | A | | 8/2022 |
| CN | 217872772 | U | * | 11/2022 |
| GB | 1444014 | A | | 7/1976 |

OTHER PUBLICATIONS

China National Intellectual Property Administration. First notice of examination opinion of foreign counterpart 202310593526.4 Jun. 30, 2023.

* cited by examiner

ROCK SAMPLE EXTRACTION DEVICE

TECHNICAL FIELD

The present invention relates to the technical field of rock sample sampling, and in particular to a rock sample extraction device.

BACKGROUND

Rock sample refers to the work of observing and describing the lithology, mineral composition, structural composition, biological fossils, sedimentary structure, occurrence, pore cracks, various secondary changes, oil-gas-water extravasation and oil-gas-bearing characteristics, and pixel description of rock samples collected during field geological work. The observation and description of rock samples is a process of correctly understanding the core, which is a very detailed geological basic work. It is necessary to comprehensively observe and highlight the key points.

In field geological work, bored piles are mostly used for drilling, and then the distribution of strongly weathered rock samples, moderately weathered rock samples and slightly weathered rock samples under different well depths are distinguished by extracting and collecting rock samples (rock samples here specifically refer to borehole slag return) and testing and analyzing the physical properties of rock samples.

However, most of the existing rock sample extraction devices in borehole are operated independently, that is, the extraction devices are successively lowered to different well depths according to the requirements, and the rock samples in borehole are extracted and collected for many times. This operation mode is easy to cause the problem of inaccurate sampling due to improper operation of the depth of the well. In addition, a single downhole operation can only achieve a single point acquisition operation for a well depth interval, and the sampling efficiency is low.

SUMMARY

The object of the present invention is to provide a rock sample extraction device to solve the problem of inaccurate sampling caused by improper downhole operation in the prior art. In addition, a single downhole operation can only achieve single-point sampling operation for a well depth interval, and the sampling efficiency is low.

In order to solve the above technical problems, the present invention specifically provides the following technical solution:

A rock sample extraction device, comprising a downhole plate and a plurality of sampling components uniformly arranged on the downhole plate, wherein the sampling components are used for sampling rock samples in well areas with different depths, and each sampling component is used for sampling at upper and lower ends of a same well area;

wherein, each sampling component comprises anisotropic extraction cylinders arranged on the downhole plate, and a power member arranged between the anisotropic extraction cylinders, and the power member drives the anisotropic extraction cylinders to perform telescopic movement in opposite directions, so that the anisotropic extraction cylinders carry out sampling operations when extending outwards.

As a preferred solution of the present invention, the anisotropic extraction cylinders comprise a first extraction cylinder and a second extraction cylinder which are arranged at upper and lower positions of the power member; a surface of the downhole plate is provided with a buckling plate for supporting the first extraction cylinder and the second extraction cylinder; the first extraction cylinder and the second extraction cylinder are movably installed in the buckling plate and can move freely along a length direction of the buckling plate.

As a preferred solution of the present invention, the first extraction cylinder and the second extraction cylinder are of hollow structures, and openings of the first extraction cylinder and the second extraction cylinder are provided with tapered chisel plates, and outer surfaces of the first extraction cylinder and the second extraction cylinder are provided with threaded grooves; an inner wall of the buckling plate is provided with a stopper inserted in the threaded groove; the first extraction cylinder and the second extraction cylinder are driven by the power member to perform rotary telescopic movement along the inside of the buckling plate.

As a preferred solution of the present invention, the inner wall of the buckling plate is in an arc shape that wraps around the first extraction cylinder and the second extraction cylinder, and upper and lower end faces of the buckling plate are respectively provided with U-shaped slots, and a working shaft of the power member drives the first extraction cylinder and the second extraction cylinder in the U-shaped slots to perform rotary telescopic movement.

As a preferred solution of the present invention, the power member comprises a servo motor installed on the downhole plate and a rotating panel arranged on an output shaft of the servo motor; a surface of the rotating panel is fixedly provided with two pull rods in a same diameter direction; when the servo motor rotates, the pull rods are used to drive the first extraction cylinder and the second extraction cylinder to perform rotary telescopic movement along the length direction of the buckling plate;

the other end of the pull rod is provided with a tongue-shaped slot, and the end faces of the first extraction cylinder and the second extraction cylinder are respectively provided with limit protrusions; the pull rods drive the first extraction cylinder and the second extraction cylinder to do telescopic movement in the buckling plate by using the limiting effect of the tongue-shaped slot and the limit protrusions when the rotating panel makes circular movement.

As a preferred solution of the present invention, the limit protrusion comprises a first elastic block, a second elastic block and a vertical rod arranged between the first elastic block and the second elastic block; a distance between the first elastic block and the second elastic block in an unstressed state is the same as a thickness of the pull rod;

and a short diameter of the tongue-shaped slot is the same as a diameter of the vertical rod, and the limit protrusion can move circumferentially along the inside of the tongue-shaped slot.

As a preferred solution of the present invention, the first elastic block and the second elastic block both comprise fixed blocks fixedly installed at the ends of the first extraction cylinder and the second extraction cylinder, and movable blocks connected with the fixed blocks through springs, wherein an elastic rubber block surrounding the outer side of the spring is arranged between the fixed block and the movable block;

wherein, the fixed block of the first elastic block is fixedly installed with one end of the vertical rod, and the fixed block of the second elastic block is in threaded engagement with the other end of the vertical rod.

As a preferred solution of the present invention, the diameters of the movable block and the fixed block are smaller than an inner diameter of the buckling plate, and both the movable block and the fixed block can move freely in an area surrounded by the inner wall of the buckling plate.

As a preferred solution of the present invention, the lengths of the first extraction cylinder and the second extraction cylinder are not greater than a width of the downhole plate, and an interval between two groups of sampling components is not less than a length by which the pull rod goes beyond the buckling plate in a vertical state.

As a preferred solution of the present invention, an end of the buckling plate is provided with a protective cover, which is divided into a plurality of rubber blocks from a central position, and the first extraction cylinder and the second extraction cylinder do telescopic movement from the surrounding areas of the plurality of rubber blocks, and the protective cover is used for protecting the ends of the first extraction cylinder and the second extraction cylinder before sampling.

Compared with the prior art, the present invention has the following beneficial effects:

The present invention mainly aims at sampling the rock samples in the borehole formed by bored piles, and integrates a plurality of groups of sampling components on a downhole plate, so that simultaneous sampling operation can be realized for a plurality of well depth intervals in the borehole, and sampling work for a specific well depth can also be carried out according to requirements; meanwhile, sampling work can be carried out at two points in a well depth interval, thus enriching the diversity of sampling.

In addition, each group of sampling components uses the same power component, that is, one power component is used to complete two-point sampling at the same time, thus reducing the use of power components, reducing the total weight of the whole rock sample extraction device, facilitating downhole operation, and simultaneously meeting the multi-coverage of rock sample extraction.

BRIEF DESCRIPTION OF DRAWINGS

In order to explain the embodiment of the present invention or the technical solution in the prior art more clearly, the drawings needed in the description of the embodiment or the prior art will be briefly introduced below. Obviously, the attached drawings in the following description are only exemplary. For the those skilled in the art, other implementation drawings can be obtained by extension according to the attached drawings without creative work.

The reference signs in the figures are as follows.

1—Downhole plate; 2—Sampling component; 3—Tapered chisel plate; 4—Threaded groove; 5—Stopper; 6—U-shaped slot; 7—Limit projection; 8—Fixed block; 9—Spring; 10—Movable block; 11—Elastic rubber block; 12—Protective cover;

21—Anisotropic extraction cylinder; 22—Power member;

211—First extraction cylinder; 212—Second extraction cylinder; 213—Buckling plate; 221—Servo motor; 222—Rotating panel; 223—Pull rod; 224—Tongue-shaped slot;

71—First elastic block; 72—Second elastic block; 73—Vertical rod.

DESCRIPTION OF EMBODIMENTS

In the following, the technical solution in the embodiment of the present invention will be clearly and completely described with reference to the attached drawings. Obviously, the described embodiment is only a part of the embodiment of the present invention, but not the whole embodiment. Based on the embodiments in the present invention, all other embodiments obtained by ordinary technicians in the field without creative labor belong to the scope of protection of the present invention.

Figure 1:
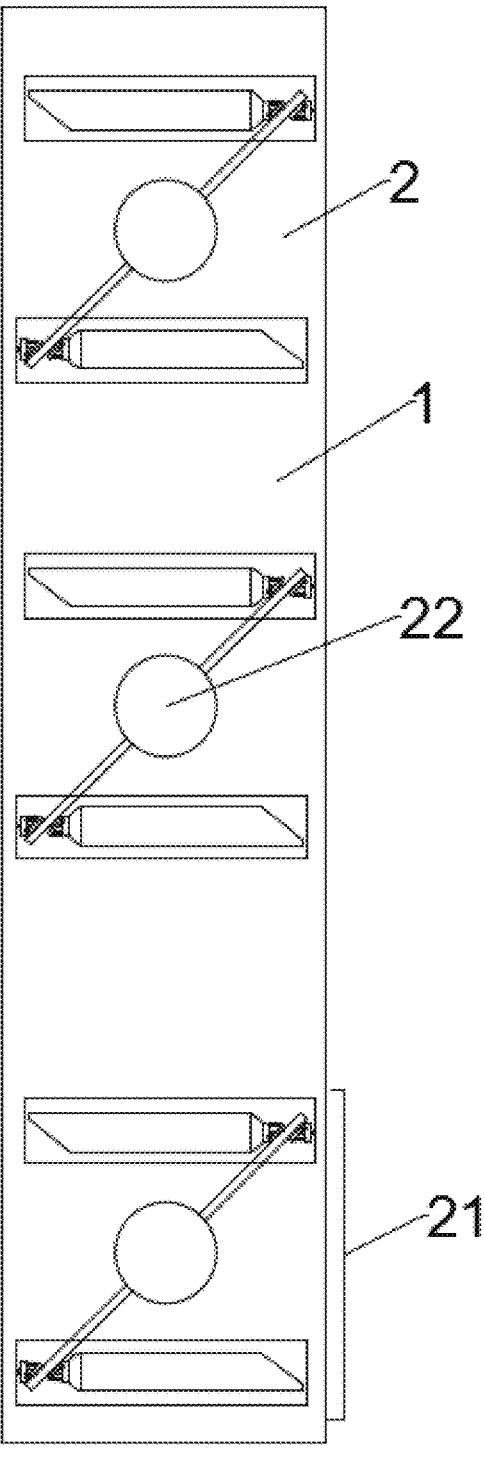
FIG. 1 is a schematic front view of an extraction device in a contracted state provided by an embodiment of the present invention.
Figure 2:
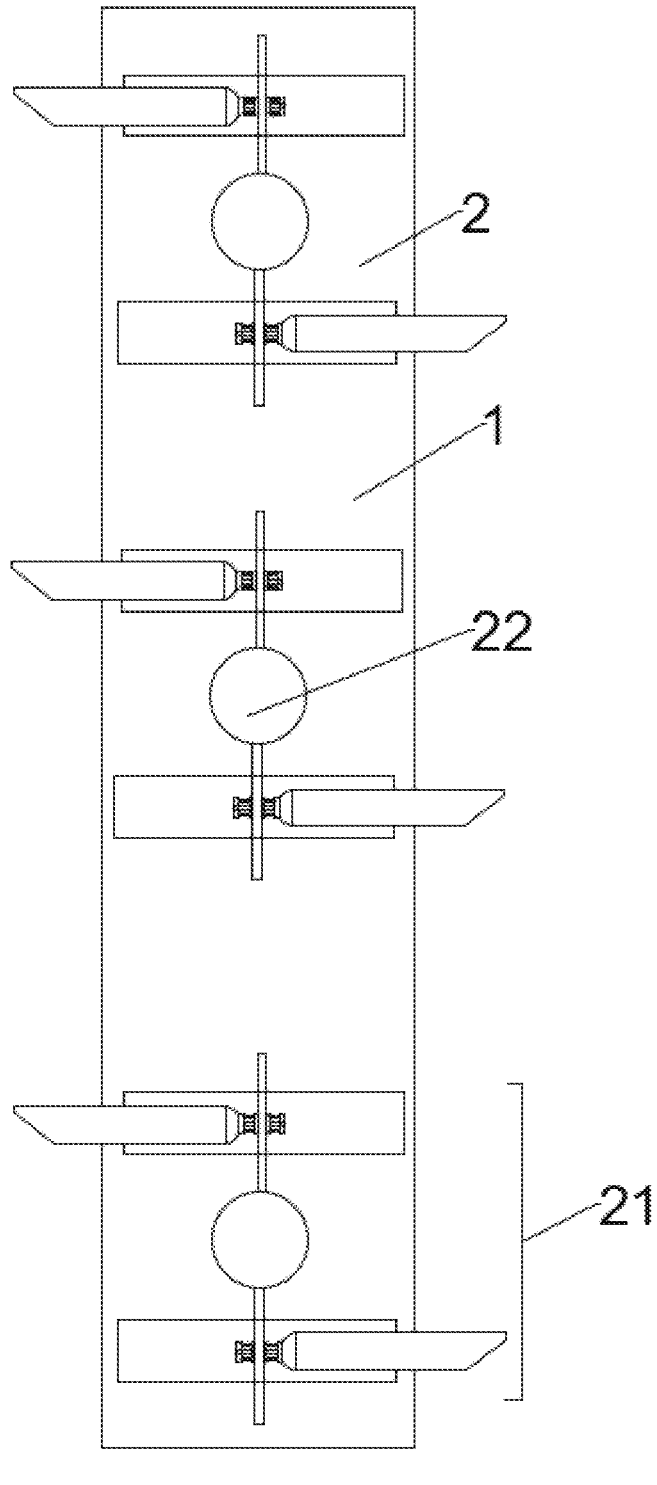
FIG. 2 is a schematic diagram of the front structure of the extraction device provided by the embodiment of the present invention in an externally stretched state.

As shown in FIG. 1 and FIG. 2, the present invention provides a rock sample extraction device. This embodiment is mainly aimed at sampling rock samples in borehole formed by bored piles, and the bored piles will crush the rock samples to some extent during borehole. Therefore, the sampling operation in this embodiment does not need to crush the hard rock samples, but only needs to collect and sample the broken rock samples according to the requirements of sampling points.

Therefore, the extraction device of this embodiment specifically includes a downhole plate 1 and a plurality of sampling components 2 uniformly arranged on the downhole plate 1, wherein the plurality of sampling components 2 are used for sampling rock samples in well areas with different depths, and each sampling component 2 is used for sampling at the upper and lower ends of the same well area.

Wherein, each sampling component 2 includes anisotropic extraction cylinders 21 arranged on the downhole plate 1, and a power member 22 arranged between the anisotropic extraction cylinders 21, and the power member 22 drives the anisotropic extraction cylinder 21 to perform telescopic movement in the opposite directions, so that sampling operation can be performed when the anisotropic extraction cylinder 21 extends outward.

As an innovation of this embodiment, the rock sample identification method is generally divided into strongly weathered, moderately weathered, slightly weathered; strongly weathered rock is harder than soil, fragile when pinched by hand; moderately weathered rock is unbreakable, and slightly weathered rock is similar to stone; the rock sample forms broken samples during the borehole of bored piles. This embodiment mainly collects the broken rock samples, therefore the downhole plate 1 can move down along the borehole formed by bored piles, and the downhole plate 1 is mainly used as the bearing plate of the sampling component 2, and its diameter is smaller than the inner diameter of the borehole hole, so that the downhole operation can be carried out smoothly.

There are a plurality of sampling components 2, which are uniformly arranged along the length direction of the downhole plate 1, and the installation position of each sampling component 2 corresponds to a group of well depth intervals, so that a plurality of sampling components 2 can sample rock samples with different depths in the borehole.

In addition, in this embodiment, each group of sampling components 2 uses the same power member 22 to drive the anisotropic extraction cylinders 21 to complete the sampling work in the opposite directions at the same time, so each group of sampling components 2 completes the sampling work at two points corresponding to the well depth interval. Therefore, this embodiment uses one power member 22 to complete the sampling work at two points, which makes the structural installation more compact, reduces the number of power installations, reduces the total weight of the rock sample extraction device, and facilitates the downhole operation.

Figure 3:
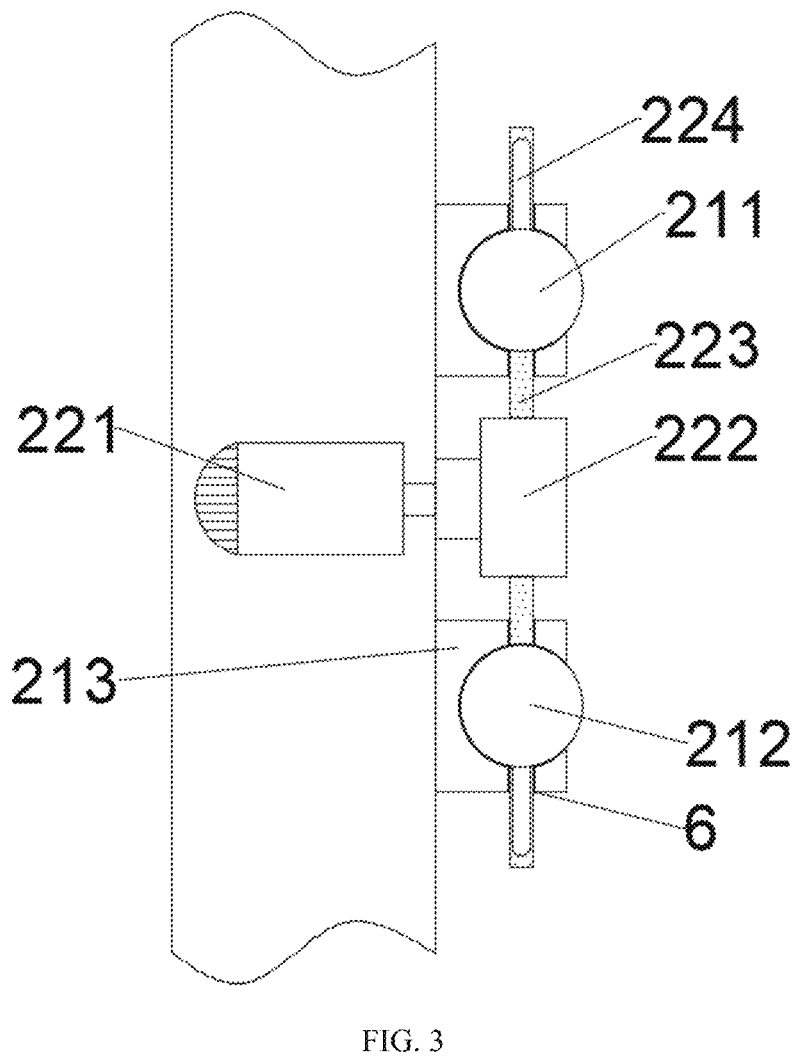
FIG. 3 is a schematic side sectional view of the sampling component provided by the embodiment of the present invention.

Specifically, as shown in FIGS. 2 and 3, the anisotropic extraction cylinder 21 includes a first extraction cylinder 211 and a second extraction cylinder 212 arranged at the upper and lower positions of the power member 22 (power member 22 is labeled in FIG. 2; and power member 22 includes a servo motor 221 a rotating panel 222 which are labeled in FIG. 3), and the surface of the downhole plate 1 is provided with a buckling plate 213 for supporting the first extraction cylinder 211 and the second extraction cylinder 212, and the first extraction cylinder 211 and the second extraction cylinder 212 are movably installed in the buckling plate 213 and can move freely along the length direction of the buckling plate 213.

When the power member 22 works, it drives the first extraction cylinder 211 and the second extraction cylinder 212 to move freely along the length direction of the buckling plate 213, wherein the first extraction cylinder 211 and the second extraction cylinder 212 move in opposite directions synchronously, thus completing the rock sample extraction at two points in the well depth interval corresponding to the first extraction cylinder 211 and the second extraction cylinder 212.

Figure 4:
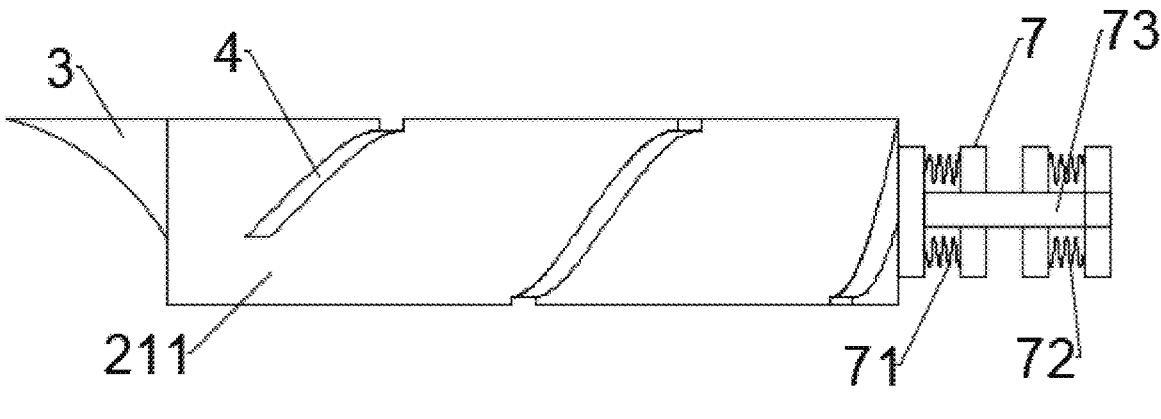
FIG. 4 is a schematic structural diagram of the first extraction cylinder or the second extraction cylinder provided by the embodiment of the present invention.
Figure 5:
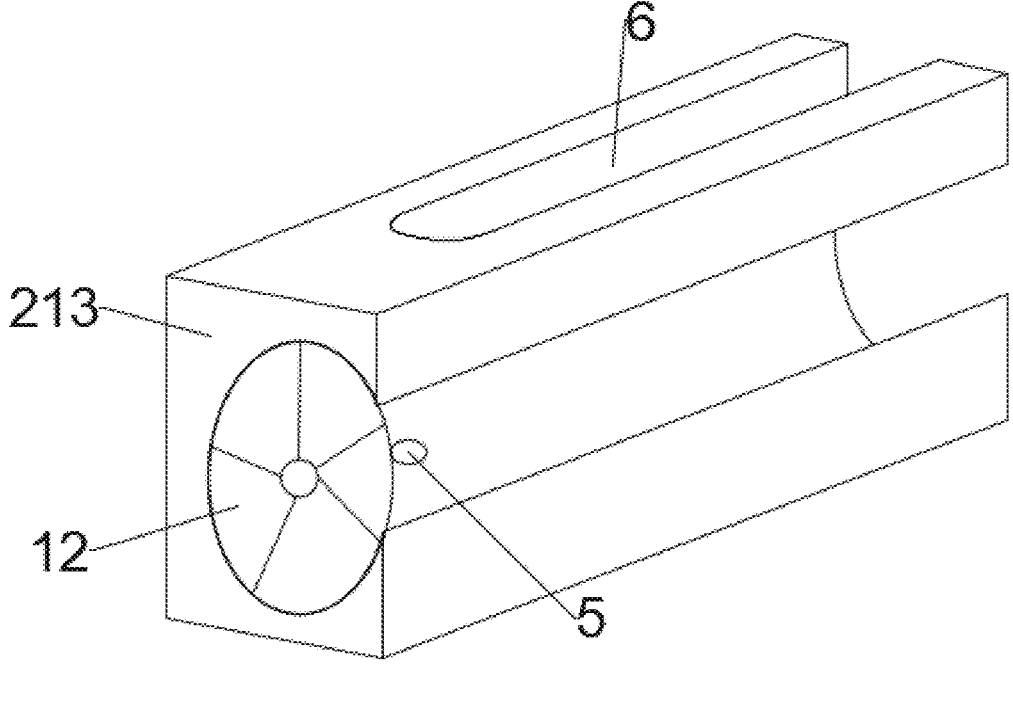
FIG. 5 is a schematic structural diagram of the buckling plate provided by the embodiment of the present invention.

FIG. 4 is a schematic structural diagram of the first extraction cylinder 211. Although not shown, the second extraction cylinder 212 has the same structure as illustrated for the first extraction cylinder 211 in FIG. 4. FIG. 5 is a schematic structural diagram of the buckling plate 213. The first extraction cylinder 211 and the second extraction cylinder 212 are hollow structures, and the openings of the first extraction cylinder 211 and the second extraction cylinder 212 are provided with tapered chisel plates 3, the outer surfaces of the first extraction cylinder 211 and the second extraction cylinder 212 are provided with threaded grooves 4; the inner wall of the buckling plate 213 is provided with a stopper 5 inserted in the threaded groove 4, and the first extraction cylinder 211 and the second extraction cylinder 212 are driven by the power member 22 to perform rotary telescopic movement along the inside of the buckling plate 213.

The power member 22 pushes the first extraction cylinder 211 and the second extraction cylinder 212 to move synchronously in opposite directions, and during the movement, the first extraction cylinder 211 and the second extraction cylinder 212 rotate along the inside of the buckling plate 213 through the limiting action of the stopper 5 and the threaded groove 4, therefore the tapered chisel plate 3 can improve the efficiency of rock sample collection by screwing in.

The power member 22 pushes the first extraction cylinder 211 and the second extraction cylinder 212 to move freely along the length direction of the buckling plate 213. The power member 22 includes a servo motor 221 installed on the downhole plate 1 and a rotating panel 222 arranged on the output shaft of the servo motor 221. Two pull rods 223 in the same diameter direction are fixedly installed on the surface of the rotating panel 222; when the servo motor 221 rotates, the pull rods 223 are used to drive the first extraction cylinder 211 and the second extraction cylinder 212 to do rotary telescopic motion along the length direction of the buckling plate 213.

In order to compensate the horizontal distance caused by the movement of the first extraction cylinder 211 and the second extraction cylinder 212, the other end of the pull rod 223 is provided with a tongue-shaped slot 224, and the end faces of the first extraction cylinder 211 and the second extraction cylinder 212 are respectively provided with limit protrusions 7. As shown in FIGS. 3 and 5, the pull rods 223 drive the first extraction cylinder 211 and the second extraction cylinder 212 to do telescopic movement in the buckling plate 213 by using the limiting function of the tongue-shaped slot 224 and the limit protrusions 7 when the rotating panel 222 moves in a circular motion.

The structure of the buckling plate 213 is shown in FIG. 5. The inner wall of the buckling plate 213 is in an arc shape wrapping around the first extraction cylinder 211 and the second extraction cylinder 212, and the upper and lower end faces of the buckling plate 213 are respectively provided with U-shaped slots 6. The working shaft of the power member 22, namely the pull rod 223, drives the first extraction cylinder 211 and the second extraction cylinder 212 to do rotary telescopic motion in the U-shaped slots 6.

When the servo motor 221 rotates, the first extraction cylinder 211 and the second extraction cylinder 212 are driven by the pull rod 223 to complete the precession work.

When the servo motor 221 rotates in the forward direction, the pull rod 223 rotates with it. When rotating, the pull rod 223 drives the first extraction cylinder 211 and the second extraction cylinder 212 to extend outward in the buckling plate 213 by the limiting action of the limit protrusion 7 and the tongue-shaped slot 224, and then the first extraction cylinder 211 and the second extraction cylinder 212 rotate under the limiting action of the stopper 5 and the threaded groove 4.

However, since the limit protrusion 7 and the tongue-shaped slot 224 are movable limiting modes, the mounting mode of the limit protrusion 7 and the tongue-shaped slot 224 will not limit the rotation movement of the first extraction cylinder 211 and the second extraction cylinder 212, and the first extraction cylinder 211 and the second extraction cylinder 212 in the precession state can complete the extraction of the broken rock sample.

When the servo motor 221 rotates in the reverse direction, the pull rod 223 rotates with it. When rotating, the pull rod 223 drives the first extraction cylinder 211 and the second extraction cylinder 212 to retract inward in the buckling plate 213 by the limiting function of the limit protrusion 7 and the tongue-shaped slot 224, and then the rock samples in the first extraction cylinder 211 and the second extraction cylinder 212 return to the buckling plate 213 again, thus completing the rock sample collection work inside the borehole.

According to the above, when the servo motor 221 rotates forward and backward, the first extraction cylinder 211 and the second extraction cylinder 212 are driven to expand and contract by the limiting action of the limit protrusion 7 and the tongue-shaped slot 224. If the space between the limit protrusion 7 and the pull rod 223 is too small, the rotation action of the pull rod 223 will be affected. If the space between the limit protrusion 7 and the pull rod 223 is too large, then the coherent movement of the first extraction cylinder 211 and the second extraction cylinder 212 of the pull rod 223 is affect, therefore when the limit protrusion 7 has a certain buff function, the coherent movement of the first extraction cylinder 211 and the second extraction cylinder 212 can be ensured.

Figure 6:
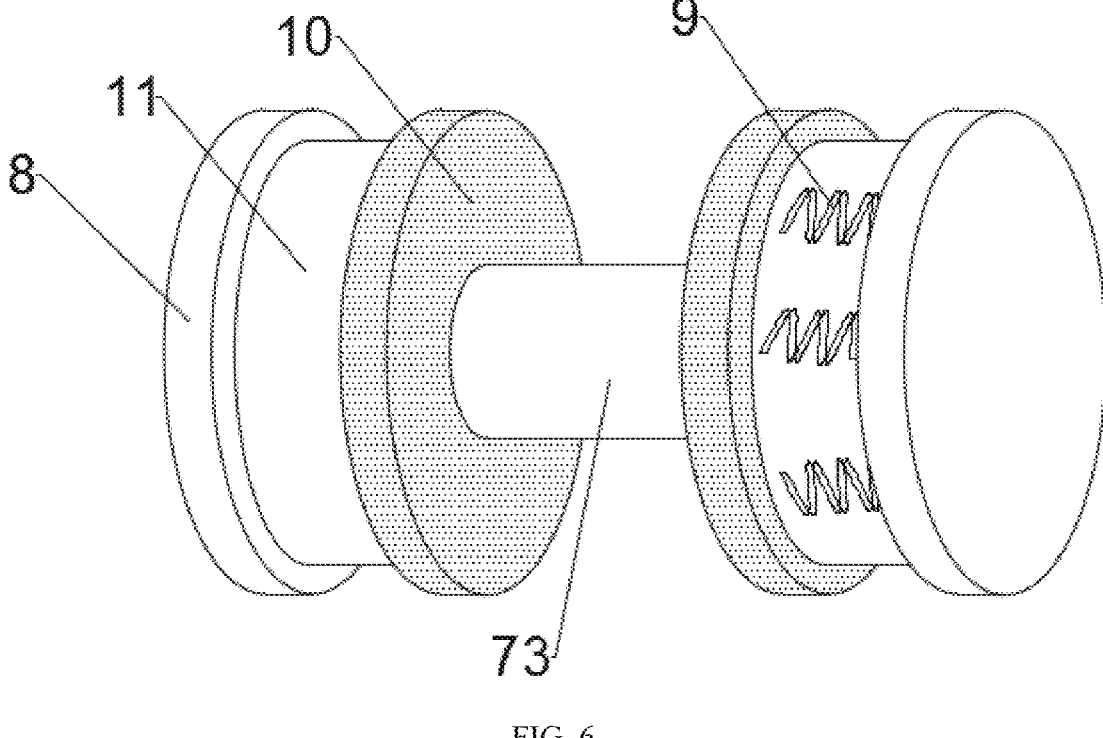
FIG. 6 is a schematic structural diagram of a limit protrusion provided by an embodiment of the present invention.

As shown in FIG. 6, the limit protrusion 7 includes a first elastic block 71, a second elastic block 72 and a vertical rod 73 arranged between the first elastic block 71 and the second elastic block 72. The distance between the first elastic block 71 and the second elastic block 72 in an unstressed state is the same as the thickness of the pull rod 223, so when the pull rod 223 rotates forward and backward, the elastic action of the second elastic block 72 can ensure the smooth movement of the tongue-shaped groove 224 along the limit protrusion 7.

In addition, the short diameter of the tongue-shaped slot 224 is the same as the diameter of the vertical rod 73, and the limit protrusion 7 can move circumferentially along the tongue-shaped slot 224.

Specifically, both the first elastic block 71 and the second elastic block 72 include fixed blocks 8 fixedly installed at the ends of the first extraction cylinder 211 and the second extraction cylinder 212, and movable blocks 10 connected with the fixed blocks 8 through springs 9, and an elastic rubber block 11 surrounding the outer side of the spring 9 is arranged between the fixed block 8 and the movable block 10.

The fixed block 8 of the first elastic block 71 is fixedly installed with one end of the vertical rod 73, and the fixed block 8 of the second elastic block 72 is threadedly engaged with the other end of the vertical rod 73.

In this embodiment, the fixing block 8 of the second elastic block 72 can be detached from the vertical rod 73 in order to conveniently pour out the rock samples extracted in the first extraction cylinder 211 and the second extraction cylinder 212 after the downhole plate 1 is pulled out from the borehole. Therefore, the pull rod 223 can be detached from the vertical rod 73, which is convenient for directly taking out the first extraction cylinder 211 and the second extraction cylinder 212 to obtain the collected rock samples with different well depths.

Further, in order to realize the telescopic movement of the first extraction cylinder 211 and the second extraction cylinder 212 in the buckling plate 213, the diameters of the movable block 10 and the fixed block 8 are smaller than the inner diameter of the buckling plate 213, and both the movable block 10 and the fixed block 8 can move freely in the area surrounded by the inner wall of the buckling plate 213.

The length of the first extraction cylinder 211 and the second extraction cylinder 212 is not greater than the width of the downhole plate 1, and the interval between the two groups of sampling components 2 is not less than the length by which the pull rod 223 extends beyond the buckling plate 213 when the pull rod 223 is vertical.

As another preference, in this embodiment, the first extraction cylinder 211 and the second extraction cylinder 212 for collecting rock samples are designed to be telescopic in the process of lowering and leaving the downhole plate 1, so that the downhole plate 1 in the contracted state can meet the diameter requirements of borehole, thus facilitating the lowering operation and protecting the collecting heads of the first extraction cylinder 211 and the second extraction cylinder 212.

Therefore, in order to achieve double protection, a protective cover 12 is specially provided at the end of the buckling plate 213. As shown in FIG. 5, the protective cover 12 is divided into a plurality of rubber blocks from the central position, and the first extraction cylinder 211 and the second extraction cylinder 212 perform telescopic movement from the surrounding area of the rubber blocks, and the protective cover 12 is used to protect the ends of the first extraction cylinder 211 and the second extraction cylinder 212 before sampling.

To sum up, it needs to be further explained that the rock samples produced in the borehole process are generally divided into strongly weathered, moderately weathered and slightly weathered layers, and the edges and corners of the rock samples in strongly weathered layers are generally not obvious, and most of them are sub-edges and sub-circles, with a particle size of 5-12 cm, a low hardness and strong weathering and alteration of minerals, in which quartz and feldspar particles are more common; most of the moderately weathered rock samples are angular and angular, with a particle size of 3-8 cm, a high hardness and fresh minerals; slightly weathered rock has a hardness equivalent to that of stone. The crushing function of the extraction device in this embodiment is relatively low, but the rock samples generated during borehole can be extracted and sampled, that is, the rock samples broken during drilling can be directly extracted without high-strength crushing, so the extraction cylinder used for collecting rock samples does not need to have the crushing function, and is only used for collecting the broken rock samples generated during borehole.

In this embodiment, a plurality of groups of sampling components are integrated on a downhole plate, so that simultaneous sampling operations can be realized for a plurality of well depth intervals in the borehole, and sampling work for a specific well depth can also be carried out as required; meanwhile, sampling work can be carried out at two points in a well depth interval, thus enriching the diversity of sampling.

In addition, each group of sampling components uses the same power component, that is, one power component is used to complete two-point sampling at the same time, thus reducing the use of power components, reducing the total weight of the whole rock sample extraction device, facilitating downhole operation, and simultaneously meeting the multi-coverage of rock sample extraction.

The above embodiments are only exemplary embodiments of this application, and are not used to limit this application. The protection scope of this application is defined by the claims. Those skilled in the art can make various modifications or equivalent substitutions within the spirit and protection scope of this application, and such modifications or equivalent substitutions should also be regarded as falling within the protection scope of this application.

What is claimed is:

1. A rock sample extraction device, comprising
a downhole plate (1) and a plurality of sampling components (2) uniformly arranged on the downhole plate (1), wherein the sampling components (2) are used for sampling rock samples in well areas with different depths, and each sampling component (2) is used for sampling at upper and lower ends of a same well area;
wherein, each of the sampling components (2) comprises anisotropic extraction cylinders (21) arranged on the downhole plate (1), and a power member (22), and wherein the power member (22) drives the anisotropic extraction cylinders (21) to perform telescopic movement in opposite directions, so that the anisotropic extraction cylinders (21) carry out sampling operations when extending outwards;
wherein, for each of the sampling components (2), the anisotropic extraction cylinders (21) comprise a first extraction cylinder (211) and a second extraction cylinder (212) which are arranged at a relatively upper position and relatively lower position, respectively, wherein the power member (22) is arranged between the first extraction cylinder (211) and the second extraction cylinder (212); the downhole plate (1) is provided with a buckling plate (213) for supporting the first extraction cylinder (211) and a buckling plate (213) for supporting the second extraction cylinder (212); the first extraction cylinder (211) and the second extraction cylinder (212) are movably installed in the respective buckling plates (213) and can move freely along a length direction of the respective buckling plate (213);

the power member (22) comprises a servo motor (221) installed on the downhole plate (1) and a rotating panel (222) arranged on an output shaft of the servo motor (221); a surface of the rotating panel (222) is fixedly provided with two pull rods (223); when the servo motor (221) rotates, the pull rods (223) are used to drive the first extraction cylinder (211) and the second extraction cylinder (212) to perform rotary telescopic movement along the length direction of the respective buckling plates (213); and the pull rods (223) are each provided with a respective tongue-shaped slot (224), and the first extraction cylinder (211) and the second extraction cylinder (212) are respectively provided with limit protrusions (7); the pull rods (223) drive the first extraction cylinder (211) and the second extraction cylinder (212) to do telescopic movement in the respective buckling plates (213) by using a limiting effect of the respective tongue-shaped slots (224) and the limit protrusions (7) when the rotating panel (222) makes circular movement.

2. The rock sample extraction device according to claim 1, wherein, for each of the sampling components (2), the first extraction cylinder (211) and the second extraction cylinder (212) are of hollow structures, and openings of the first extraction cylinder (211) and the second extraction cylinder (212) are provided with tapered chisel plates (3), and outer surfaces of the first extraction cylinder (211) and the second extraction cylinder (212) are provided with threaded grooves (4); an inner wall of each of the buckling plates (213) is provided with a stopper (5) inserted in the threaded grooves (4); the first extraction cylinder (211) and the second extraction cylinder (212) are driven by the power member (22) to perform rotary telescopic movement along the respective buckling plates (213).

3. The rock sample extraction device according to claim 2, wherein, for each of the sampling components (2), the inner wall of each of the buckling plates (213) is in an arc shape that wraps around the first extraction cylinder (211) and the second extraction cylinder (212), and upper and lower end faces of each of the buckling plates (213) are respectively provided with U-shaped slots (6), and a working shaft of the power member (22)

drives the first extraction cylinder (211) and the second extraction cylinder (212) in the U-shaped slots to perform rotary telescopic movement.

4. The rock sample extraction device according to claim 1, wherein, for each of the sampling components (2), each of the limit protrusions (7) comprises a first elastic block (71), a second elastic block (72) and a vertical rod (73) arranged between the first elastic block (71) and the second elastic block (72); a distance between the first elastic block (71) and the second elastic block (72) in an unstressed state is the same as a thickness of the pull rods (223);

and a diameter of each of the tongue-shaped slots (224) is the same as a diameter of the respective vertical rod (73), and each of the limit protrusions (7) can move circumferentially along the inside of the respective tongue-shaped slot (224).

5. The rock sample extraction device according to claim 4, wherein, for each of the sampling components (2), the first elastic block (71) comprises fixed blocks (8) fixedly installed at the ends of the first extraction cylinder (211) and the second extraction cylinder (212), and movable blocks (10) connected with the fixed blocks (8) through springs (9), wherein an elastic rubber block (11) is arranged between the fixed block (8) and the movable block (10);

wherein, the fixed block (8) of the first elastic block (71) is fixedly installed with one end of the vertical rod (73), and the fixed block (8) of the second elastic block (72) is in threaded engagement with another end of the vertical rod (73).

6. The rock sample extraction device according to claim 5, wherein, for each of the sampling components (2), the diameters of the movable block (10) and the fixed block (8) are smaller than an inner diameter of the respective buckling plate (213), and both the movable block (10) and the fixed block (8) can move freely in an area surrounded by the inner wall of the respective buckling plate (213).

7. The rock sample extraction device according to claim 2, wherein, for each of the sampling components (2), the lengths of the first extraction cylinder (211) and the second extraction cylinder (212) are not greater than a width of the downhole plate (1), and an interval between two groups of sampling components (2) is not less than a length by which the pull rods (223) go beyond the respective buckling plates (213) in a vertical state.

8. The rock sample extraction device according to claim 2, wherein, for each of the sampling components (2), an end of each of the buckling plates (213) is provided with a protective cover (12), which is divided into a plurality of rubber blocks from a central position, and the protective covers (12) are used for protecting the ends of the first extraction cylinder (211) and the second extraction cylinder (212) before sampling.

* * * * *